(12) United States Patent
Riff et al.

(10) Patent No.: US 11,254,015 B2
(45) Date of Patent: Feb. 22, 2022

(54) MULTI-AXIS GRIPPER FOR LAB AUTOMATION ROBOT

(71) Applicant: Thermo CRS Ltd., Burlington (CA)

(72) Inventors: Michael Paul Riff, Burlington (CA); Jonathan Wittchen, Burlington (CA); Gary Darnel, Hamilton (CA); Stephen Wayne Johnson, Waterdown (CA)

(73) Assignee: Thermo CRS Ltd., Burlington (CA)

( * ) Notice: Subject to any disclaimer, the term of this patent is extended or adjusted under 35 U.S.C. 154(b) by 0 days.

(21) Appl. No.: 17/015,326

(22) Filed: Sep. 9, 2020

(65) Prior Publication Data

US 2021/0086373 A1 Mar. 25, 2021

Related U.S. Application Data

(60) Provisional application No. 62/904,732, filed on Sep. 24, 2019.

(51) Int. Cl.
 *B25J 15/08* (2006.01)
 *B25J 18/00* (2006.01)
 *B25J 17/02* (2006.01)

(52) U.S. Cl.
 CPC ............. *B25J 15/08* (2013.01); *B25J 17/025* (2013.01); *B25J 18/00* (2013.01)

(58) Field of Classification Search
 CPC . B25J 15/08; B25J 17/025; B25J 18/00; B25J 15/0491; B25J 15/0425; B25J 15/0475
 USPC ............................... 294/106, 103.1, 115, 116
 See application file for complete search history.

(56) References Cited

U.S. PATENT DOCUMENTS

| 4,062,455 | A |   | 12/1977 | Flatau |
| 4,068,156 | A |   | 1/1978  | Johnson et al. |
| 4,529,237 | A | * | 7/1985  | Gupta ..................... B25J 15/02 |
|           |   |   |         | 294/106 |
| 4,661,039 | A |   | 4/1987  | Brenholt |
| 4,676,541 | A | * | 6/1987  | Lord ................... B25J 15/0475 |
|           |   |   |         | 294/119.1 |
| 4,693,663 | A |   | 9/1987  | Brenholt et al. |
| 4,784,422 | A |   | 11/1988 | Jones et al. |
| 4,806,066 | A |   | 2/1989  | Rhodes et al. |
| 4,828,453 | A |   | 5/1989  | Martin et al. |

(Continued)

FOREIGN PATENT DOCUMENTS

WO 2016123083 A1 8/2016

OTHER PUBLICATIONS

European Patent Office, Extended European Search Report, Application No. 20197647.9, dated Feb. 23, 2021 (10 pages).

*Primary Examiner* — Paul T Chin
(74) *Attorney, Agent, or Firm* — Wood Herron & Evans LLP (57) ABSTRACT

A lab automation robot is provided including a stationary base, a swiveling tower rotatably mounted to the stationary base about a first vertical axis, an arm vertically translatably mounted to the tower, an articulating forearm coupled to the arm at an elbow joint and pivotal relative thereto about a second vertical axis, and a wrist assembly including a multi-axis gripper operatively coupled to the forearm at a wrist joint and rotatable relative thereto about a third vertical axis. The gripper is further rotatable relative to at least the forearm about a first horizontal axis and about a second horizontal axis.

16 Claims, 11 Drawing Sheets

(56) References Cited

U.S. PATENT DOCUMENTS

| | | | |
|---|---|---|---|
| 5,256,128 A * | 10/1993 | Neumann | B23Q 1/0063 294/86.4 |
| 5,511,147 A | 4/1996 | Abdel-Malek | |
| D496,478 S * | 9/2004 | Wu | D26/28 |
| 8,141,924 B2 | 3/2012 | Albin | |
| 8,176,808 B2 | 5/2012 | Fisk et al. | |
| 8,206,144 B2 * | 6/2012 | Ng | B29C 49/4215 425/526 |
| 8,242,730 B2 | 8/2012 | Nichols et al. | |
| 8,322,249 B2 | 12/2012 | Seavey et al. | |
| 8,414,043 B2 | 4/2013 | Albin et al. | |
| 8,442,686 B2 | 5/2013 | Saito et al. | |
| 8,614,559 B2 | 12/2013 | Kassow et al. | |
| 9,026,250 B2 | 5/2015 | Summer et al. | |
| 9,149,927 B2 | 10/2015 | Sturm | |
| 9,409,292 B2 | 8/2016 | Smith et al. | |
| 9,555,545 B2 | 1/2017 | Linnell et al. | |
| 9,701,018 B2 | 7/2017 | Linnell et al. | |
| 9,746,447 B2 | 8/2017 | Fetzer et al. | |
| 9,827,677 B1 | 11/2017 | Gilbertson et al. | |
| 9,827,678 B1 | 11/2017 | Gilbertson et al. | |
| 10,112,303 B2 | 10/2018 | Vakanski et al. | |
| 10,272,573 B2 | 4/2019 | Tan et al. | |
| 2005/0016313 A1 | 1/2005 | Robertson et al. | |
| 2009/0173177 A1 | 7/2009 | Sugawara et al. | |
| 2010/0101356 A1 | 4/2010 | Albin | |
| 2012/0061155 A1 | 3/2012 | Berger et al. | |
| 2012/0065779 A1 * | 3/2012 | Yamaguchi | B25J 9/1612 700/259 |
| 2013/0076055 A1 * | 3/2013 | Hino | H01L 21/67766 294/213 |
| 2013/0341946 A1 * | 12/2013 | Yamanaka | B25J 15/008 294/213 |
| 2014/0007731 A1 | 1/2014 | Hosek et al. | |
| 2015/0035303 A1 * | 2/2015 | Klang | B25J 15/0028 294/106 |
| 2015/0336699 A1 * | 11/2015 | Fahldieck | B65B 43/60 198/867.05 |
| 2016/0252894 A1 | 9/2016 | Kram et al. | |
| 2017/0326737 A1 | 11/2017 | Martin et al. | |
| 2018/0009111 A1 | 1/2018 | Ho et al. | |

\* cited by examiner

MULTI-AXIS GRIPPER FOR LAB AUTOMATION ROBOT

CROSS-REFERENCE TO RELATED APPLICATION

The present application claims the filing benefit of U.S. Provisional Application Ser. No. 62/904,732, filed on Sep. 24, 2019, the disclosure of which is incorporated herein by reference in its entirety.

FIELD OF THE INVENTION

The present invention relates generally to automated laboratory systems for performing scientific processes such as assays and, more particularly, to grippers for lab automation robots of such automated laboratory systems.

BACKGROUND OF THE INVENTION

Conventional automated laboratory systems include a lab automation robot and a variety of instruments positioned therearound. The lab automation robot may be, for example, a selective compliance articulated robot arm (SCARA) type, and the instruments may include, for example, a liquid handler, an incubator, a reagent dispenser, a sealer, a microplate spectrophotometer, a thermocycler, a thermocycler controller, or any other suitable instrument for performing a desired scientific process such as an assay. In order to perform an assay, a gripper provided at an end effector of the robot may grip a microtiter plate containing samples and transfer the samples between the various instruments. More particularly, the gripper may selectively retrieve a particular microtiter plate from a surface or "nest" associated with one instrument and deposit the microtiter plate on a nest associated with a different instrument, as desired.

Many SCARA type robotic devices, such as that sold by Thermo Fisher Scientific, Inc. under the trademark Spinnaker XT, are configured to position the end effector, and thus the gripper, with four degrees of freedom, consisting of three in translation and one in orientation. For example, such robotic devices may include a stationary base, a swiveling tower rotatably mounted to the stationary base about a first vertical axis, an elevator and accompanying arm vertically translatably mounted to the tower, an articulating forearm pivotably coupled to the arm about a second vertical axis, and a swiveling gripper rotatably mounted to the forearm about a third vertical axis.

Thus, the robotic device may have an aggregate positioning capability of four degrees of freedom, with the position and orientation of the gripper in three-dimensional space being adjustable in all three components of translation and in one component of rotation. More particularly, the gripper may define a Cartesian coordinate system where Z is the normal or yaw axis, X is the longitudinal or roll axis, and Y is the transverse or pitch axis, with translation of the gripper in the Z direction (e.g., moving up and down) achieved by vertical translation of the elevator along the tower, translation of the gripper in the X direction (e.g., moving forward and backward) achieved primarily by articulation of the forearm relative to the arm about the second vertical axis, translation of the gripper in the Y direction (e.g., moving left and right) achieved primarily by articulation of the forearm relative to the arm about the second vertical axis, and rotation of the gripper relative to the Z direction (e.g., yawing) achieved primarily by swiveling the gripper relative to the forearm about the third vertical axis.

However, such robotic devices do not provide rotation of the gripper relative to the X direction (e.g., rolling) or rotation of the gripper relative to the Y direction (e.g., pitching), since the nests from/on which the microtiter plates are to be retrieved/deposited are typically presumed to be horizontally level relative to the gripper and, more particularly, relative to the fingers of the gripper, such that adjustability of the gripper in these two rotatable components is not typically considered desirable or necessary. Despite this presumption, such nests are often at least slightly unlevel relative to the gripper. For example, a nest may be horizontally tilted or pivoted relative to the gripper by as much as 3°. As a result, the gripper may be unable to reliably retrieve a microtiter plate from the relatively unlevel nest or deposit a microtiter plate on the relatively unlevel nest. In some cases, the entire robotic device must be replaced with an entirely different robotic device having an aggregate positioning capability of six degrees of freedom, for example, in order to perform continued operations using the relatively unlevel nest(s).

Thus, it would be desirable to provide an improved gripper for lab automation robots to compensate for nests that are not level relative to the gripper so that the gripper may reliably retrieve/deposit a microtiter plate from/on such nests.

BRIEF DESCRIPTION OF THE DRAWINGS

Various additional features and advantages of the invention will become more apparent to those of ordinary skill in the art upon review of the following detailed description of one or more illustrative embodiments taken in conjunction with the accompanying drawings. The accompanying drawings, which are incorporated in and constitute a part of this specification, illustrate one or more embodiments of the invention and, together with the general description given above and the detailed description given below, serve to explain the one or more embodiments of the invention.

DETAILED DESCRIPTION OF THE INVENTION

Figure 1:
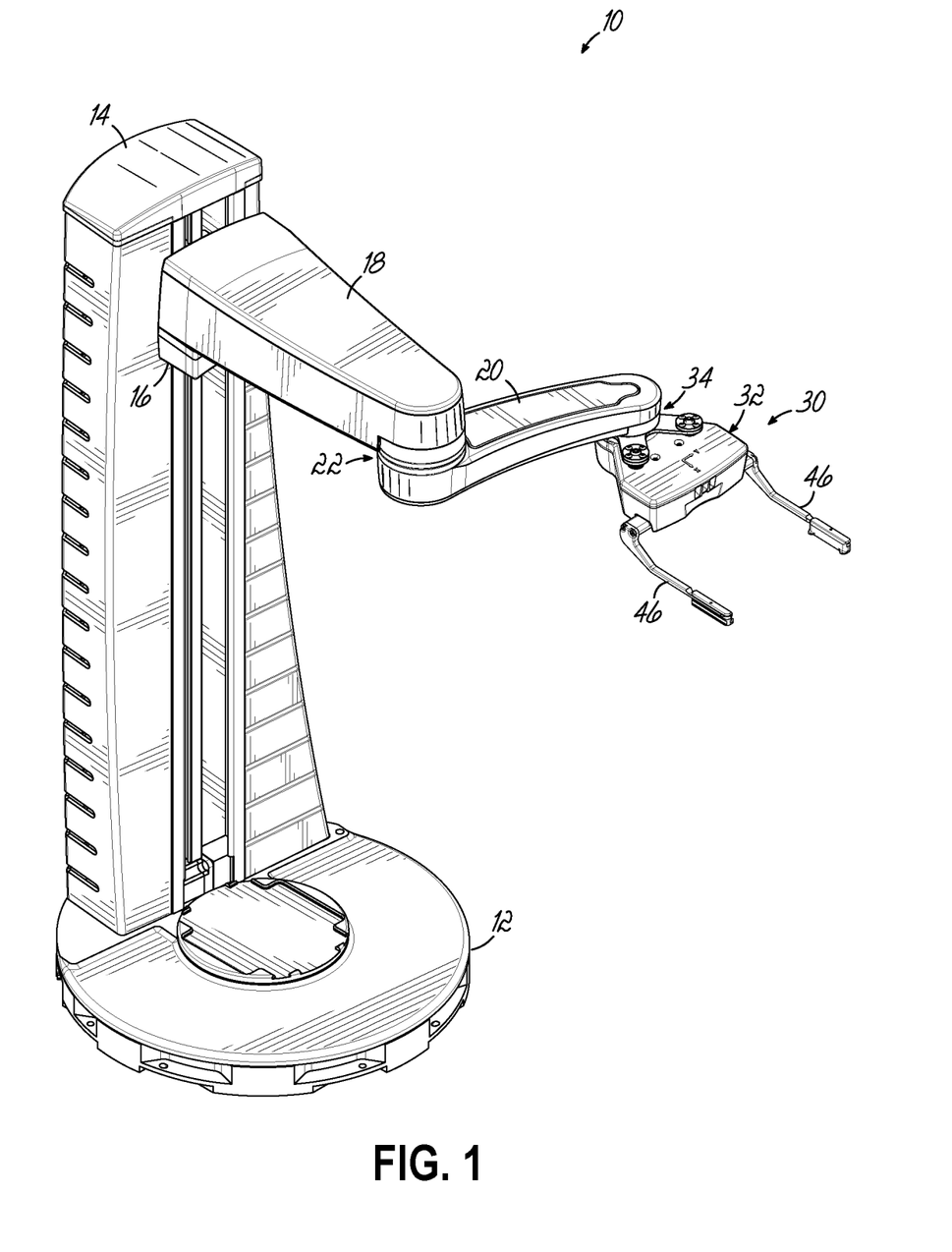
FIG. 1 is a perspective view of an exemplary laboratory robot including a wrist assembly having a multi-axis gripper in accordance with an embodiment of the present invention.
Figure 4A:
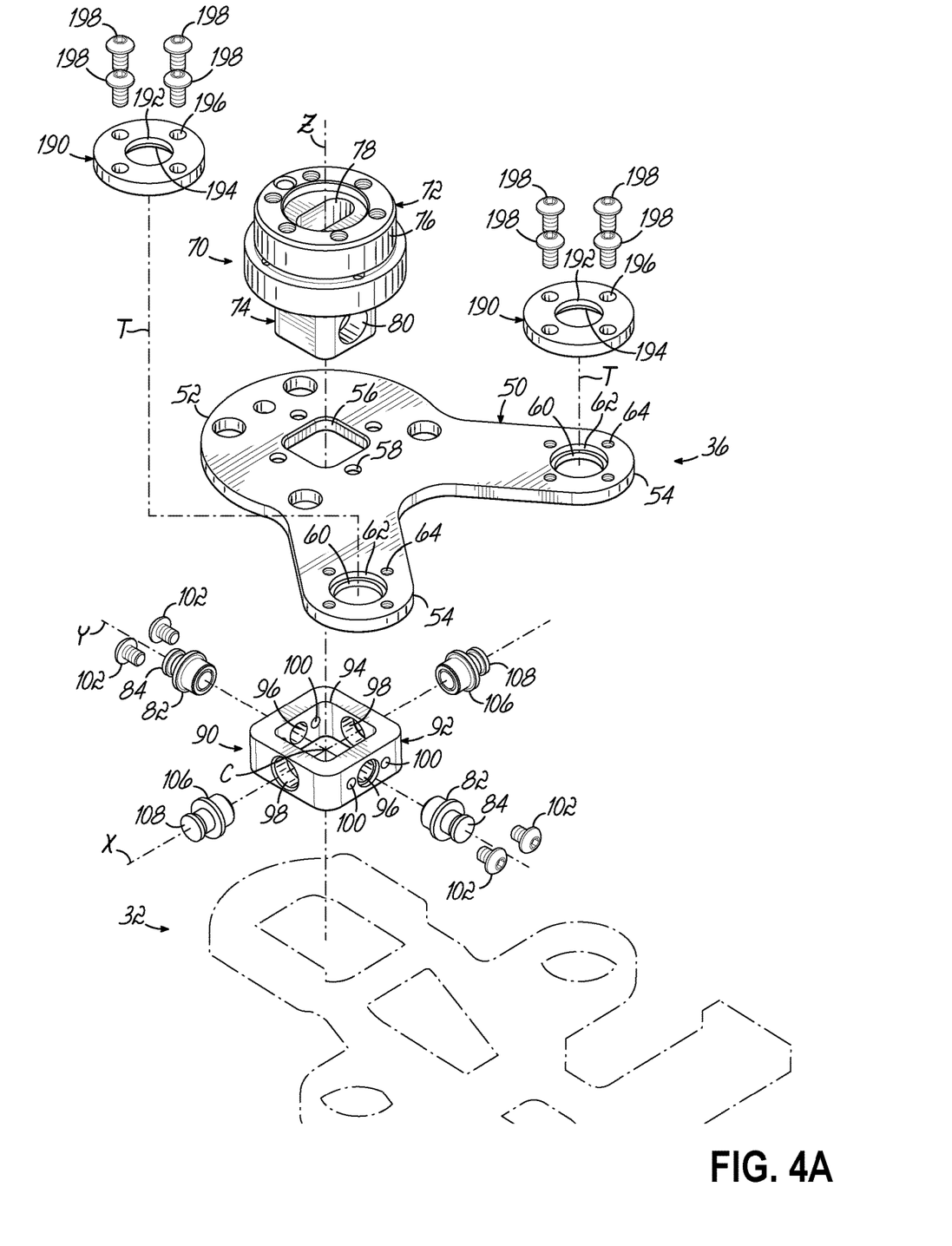
FIG. 4A is an upper partial disassembled view of the wrist assembly of FIG. 1.

With reference to FIG. 1, an exemplary robotic device 10 configured to perform at least one scientific process is shown in accordance with one embodiment of the present invention. The robotic device 10 may be a SCARA type robotic device, such as that sold by Thermo Fisher Scientific, Inc. under the trademark Spinnaker XT. Other types of robotic devices may be used, such as an articulated robotic device, a spider robotic device, or any other suitable types of robotic device. The illustrated robotic device 10 includes a stationary base 12, a swiveling tower 14 rotatably mounted to the stationary base 12 about a first vertical axis (not shown), an elevator 16 and accompanying arm 18 vertically translatably mounted to the tower, an articulating forearm 20 coupled to the arm 18 at an elbow joint 22 and pivotable relative thereto about a second vertical axis (not shown), and a wrist assembly 30 including a multi-axis gripper 32 operatively coupled to the forearm 20 at a wrist joint 34 via an end effector 36 and rotatable relative thereto about a third vertical axis or "yaw axis" Z (FIG. 4A). As set forth in further detail below, the gripper 32 is further rotatable relative to at least the forearm 20 about a first horizontal axis or "roll axis" Y and about a second horizontal axis or "pitch axis" X (FIG. 4A), such that the gripper 32 may compensate for nests that are not level relative to the gripper 32 so that the gripper 32 may reliably retrieve/deposit a microtiter plate from/on such nests. The features of the robotic device 10, wrist assembly 30, and multi-axis gripper 32 thereof are set forth in further detail below to clarify each of these functional advantages and other benefits provided in this disclosure.

Figure 2:
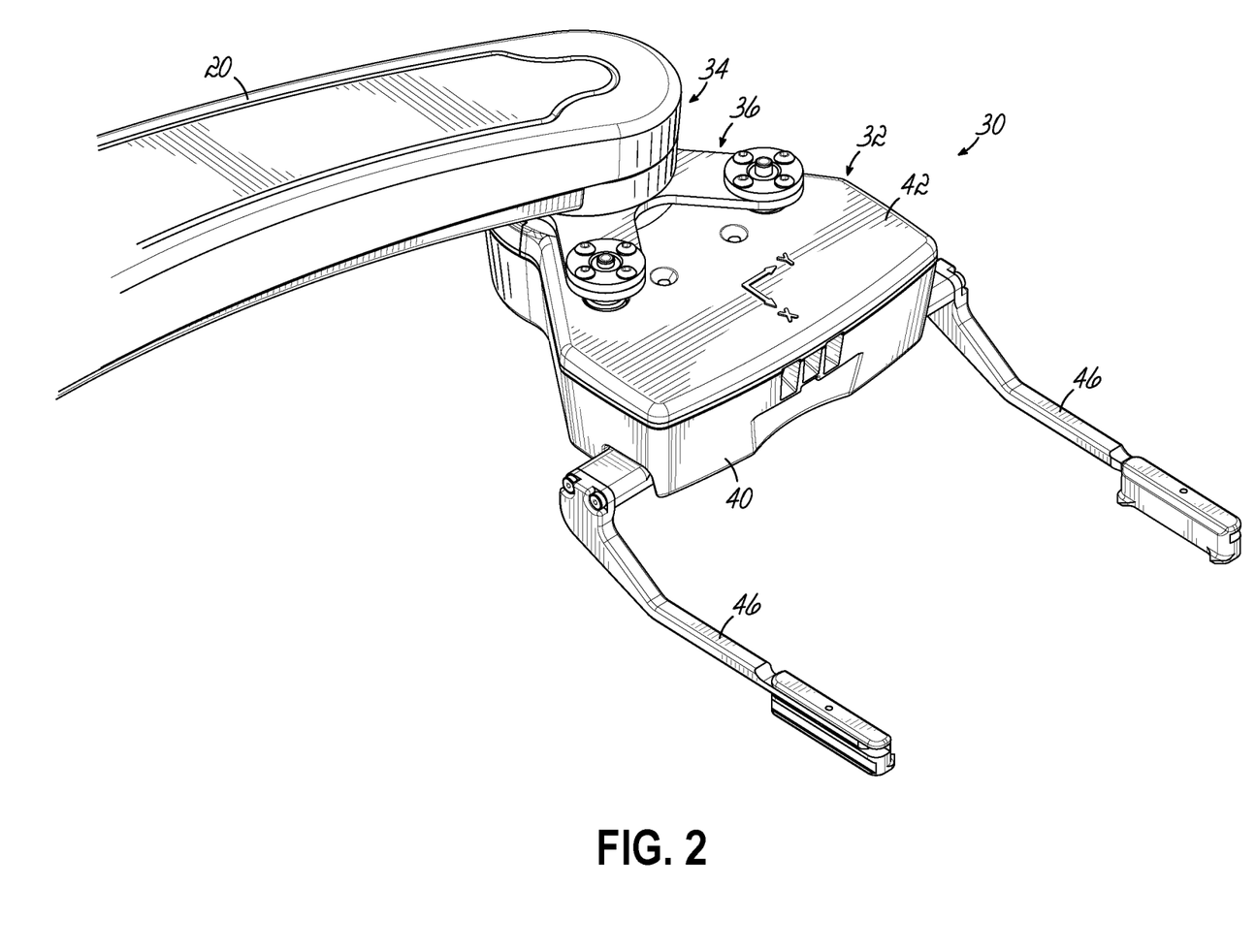
FIG. 2 is a perspective view of the wrist assembly shown in FIG. 1.
Figure 3:
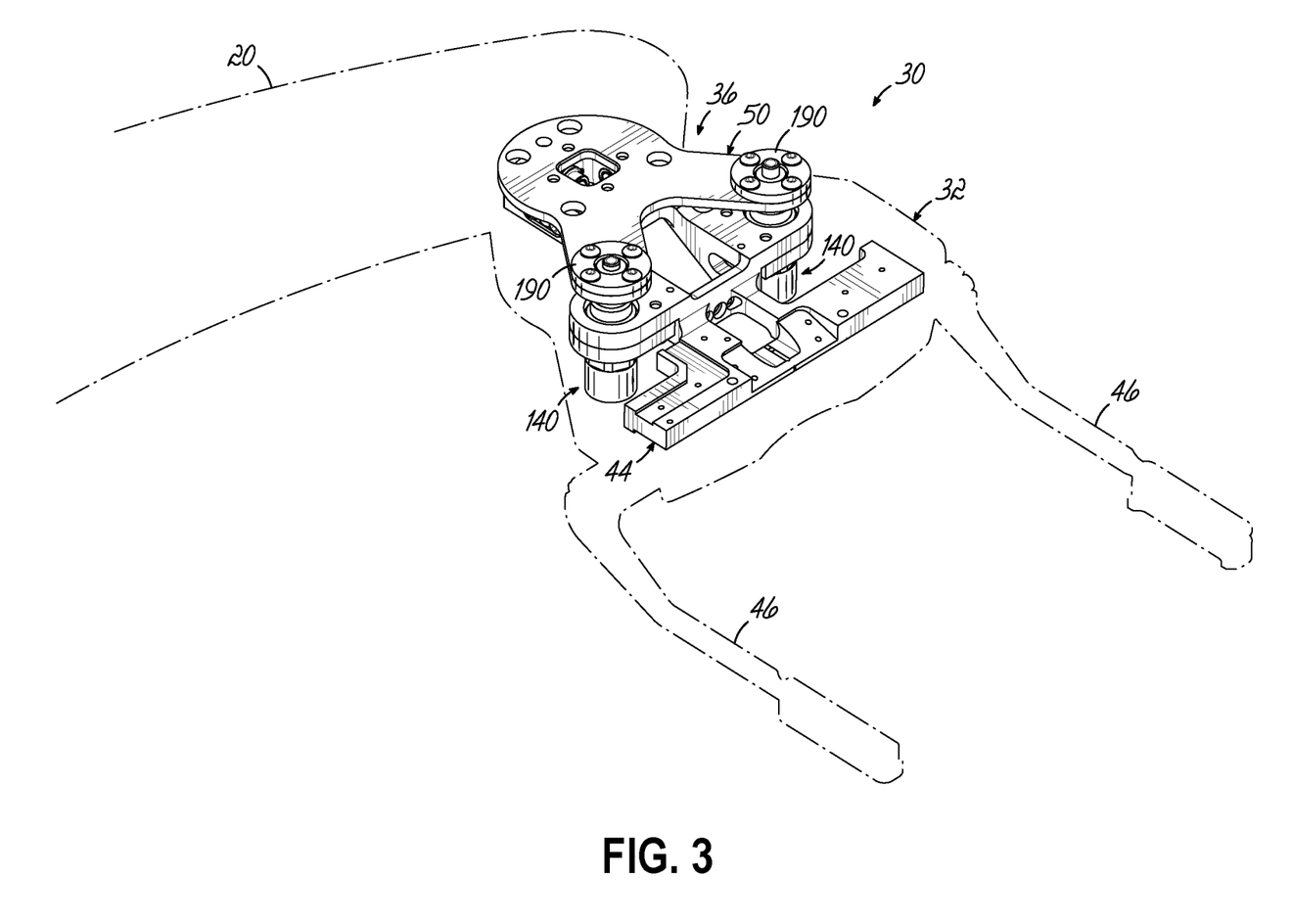
FIG. 3 is a perspective view similar to FIG. 2, with various external components of the wrist assembly from view to illustrate various internal components of the multi-axis gripper.

Referring now to FIGS. 2 and 3, the illustrated gripper 32 of the wrist assembly 30 includes a housing 40 and a top cover 42 for enclosing the various internal components of the gripper 32 including a rigid frame or body 44 thereof. The gripper 32 further includes a pair of fingers 46 extending longitudinally (e.g., parallel to a longitudinal centerline of the body 44) from the body 44 out of the housing 40 and configured to be laterally movable (e.g., parallel to a transverse or lateral centerline of the body 44) toward and away from each other for selectively gripping and releasing a microtiter plate positioned therebetween.

Referring now primarily to FIG. 4A, and with continuing reference to FIGS. 2 and 3, the illustrated end effector 36 of the wrist assembly 30 includes a generally Y-shaped plate 50 having a base portion 52 and a pair of prong portions 54 extending outwardly therefrom. As best shown in FIG. 4A, the end effector 36 includes a generally square-shaped aperture 56 extending through the base portion 52 and a plurality of through-bores 58 peripherally arranged thereabout. The end effector 36 further includes a pair of through-bores 60 extending through each of the prong portions 54 and equally spaced apart from the square-shaped aperture 56 on a same side thereof and equally spaced apart from a longitudinal centerline of the plate 50 on opposite sides thereof, along with accompanying counterbores 62 and a plurality of threaded bores 64 circumferentially arranged thereabout, the purposes of which are described below.

In the embodiment shown, the end effector 36 is operatively coupled to the forearm 20 and rotatable relative thereto about the yaw axis Z via a rotatable hub 70 of the wrist assembly 30. As best shown in FIG. 4A, the hub 70 includes an upper cylindrical portion 72 configured to be rotatably received by a corresponding bore (not shown) provided in a lower surface of the forearm 20, such that the upper cylindrical portion 72 and corresponding bore may collectively define the yaw axis Z, and a generally square-shaped lower stem portion 74 configured to be received by and mechanically engage the square-shaped aperture 56 of the end effector 36 for transferring torque directed about the yaw axis Z between the hub 70 and the end effector 36. The illustrated upper cylindrical portion 72 of the hub 70 defines at least one outer bearing surface 76 for confronting and gliding along an inner bearing surface (not shown) of the corresponding bore of the forearm 20. As shown, the hub 70 includes a keyway 78 provided in the upper cylindrical portion 72 for receiving and mechanically engaging a rotatable driveshaft of a motor (not shown) such that torque directed about the yaw axis Z may be supplied by the driveshaft to the hub 70 for effecting rotation of the hub 70 relative to the forearm 20 about the yaw axis Z, for example. In the embodiment shown, the lower stem portion 74 is sized and shaped similar to the aperture 56 of the end effector 36 such that the torque directed about the yaw axis Z received by the hub 70 from the driveshaft may be transferred from the hub 70 to the end effector 36 for effecting rotation of the end effector 36 relative to the forearm 20 about the yaw axis Z, for example. In one embodiment, the hub 70 may include a plurality of threaded bores corresponding to the plurality of through-bores 58 arranged peripherally around the aperture 56 of the end effector 36 for axial alignment therewith and receipt of fasteners (not shown) for fixedly securing the end effector 36 to the hub 70 and/or for maintaining the end effector 36 in a generally horizontally level orientation during use. In any event, the illustrated hub 70 also includes a first pair of axially-aligned pivot bores 80 extending through opposing sides of the lower stem portion 74 and configured for receiving respective flanged bushings 82 having bearing surfaces (not shown) for rotatably receiving respective pivot pins 84 therethrough, the purposes of which are described below.

As best shown in FIG. 4A, the gripper 32 is operatively coupled to the hub 70 and rotatable relative thereto about both the roll axis Y and the pitch axis X via a dual-axis yoke 90 of the wrist assembly 30. The illustrated yoke 90 includes a generally square-shaped peripheral wall 92 defining a generally square-shaped aperture 94 configured to receive the square-shaped lower stem portion 74 of the hub 70 below the end effector 36. As shown, the yoke 90 includes a second pair of axially-aligned pivot bores 96 extending through a first pair of opposing sides of the wall 92 and a third pair of axially-aligned pivot bores 98 extending through a second pair of opposing sides of the wall 92 such that the second pair of pivot bores 96 is axially perpendicular to the third pair of pivot bores 98. In the embodiment shown, the second pair of pivot bores 96 is configured for axial alignment with the first pair of pivot bores 80 of the lower stem portion 74 of the hub 70 and for receiving the respective pivot pins 84 therethrough, such that the first pair of pivot bores 80, second pair of pivot bores 96, and respective bushings 82 and pivot pins 84 may collectively define the roll axis Y, and such that the torque directed about the yaw axis Z received by the hub 70 from the driveshaft may be transferred from the hub 70 to the yoke 90 for effecting rotation of the yoke 90 relative to the forearm 20 about the yaw axis Z, for example. As shown, the yoke 90 also includes a pair of threaded bores 100 adjacent each of the second pair of pivot bores 96 for threadably receiving respective fasteners 102, such that the heads of the fasteners 102 may trap the respective pivot pin 84 against the wall 92 of the yoke 90 to thereby assist in preventing the respective pivot pin 84 from becoming inadvertently dislodged from the respective bushing 82 and/or pivot bores 80, 96. Similarly, the third pair of pivot bores 98 is configured for receiving respective flanged bushings 106 having bearing surfaces (not shown) for rotatably receiving respective pivot pins 108 therethrough, the purposes of which are described below.

Figure 4B:
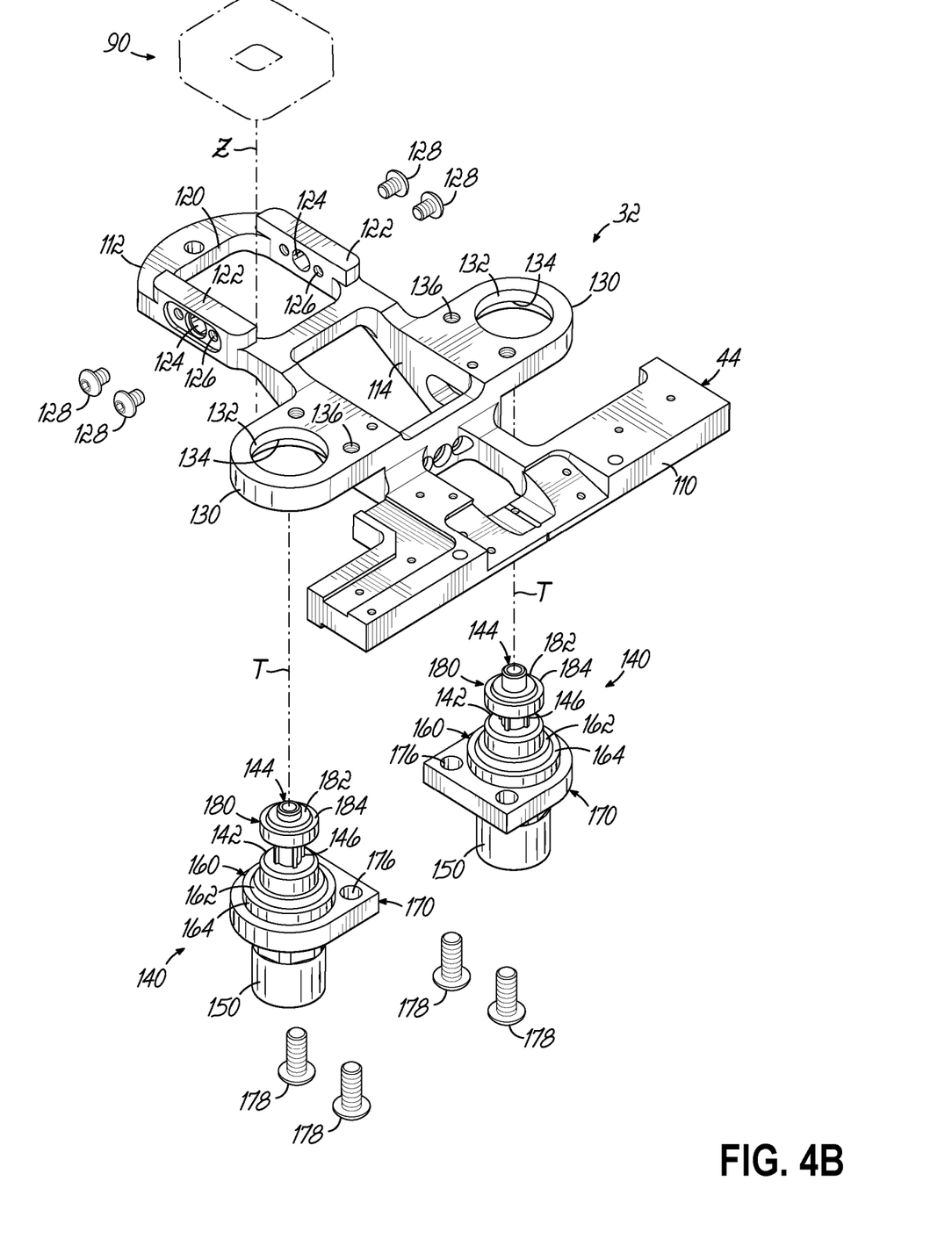
FIG. 4B is a lower partial disassembled view of the wrist assembly of FIG. 1.

Referring now primarily to FIG. 4B, and with continuing reference to FIG. 4A, the body 44 of the gripper 32 includes a laterally-extending front platform portion 110 for supporting the pair of fingers 46 in a laterally movable relationship relative to each other, a rear mounting portion 112 for facilitating movable coupling of the gripper 32 to the end effector 36, and a middle support portion 114 extending longitudinally therebetween. As described in greater detail below, the front platform portion 110 defines a support plane P1 (FIGS. 5A-6B) parallel to a gripping plane P2 (FIGS. 7 and 8) defined by the pair of fingers 46. The illustrated body 44 further includes a generally square-shaped aperture 120 extending through the rear mounting portion 112 and configured to receive the square-shaped wall 92 of the yoke 90 below the end effector 36. As shown, the rear mounting portion 112 includes a pair of longitudinally-extending sidewalls 122 arranged on opposing lateral sides of the generally square-shaped aperture 120, and a fourth pair of axially-aligned pivot bores 124 extending therethrough. In the embodiment shown, the fourth pair of pivot bores 124 is configured for axial alignment with the third pair of pivot bores 98 of the wall 92 of the yoke 90 and for receiving the respective pivot pins 108 therethrough, such that the third pair of pivot bores 98, fourth pair of pivot bores 124, and respective bushings 106 and pivot pins 108 may collectively define the pitch axis X, and such that the torque directed about the yaw axis Z received by the yoke 90 from the hub 70 may be transferred from the yoke 90 to the body 44 for effecting rotation of the body 44 together with the yoke 90, the end effector 36, and the hub 70 relative to the forearm 20 about the yaw axis Z, for example. As shown, the body 44 also includes a pair of threaded bores 126 adjacent each of the fourth pair of pivot bores 124 for threadably receiving respective fasteners 128, such that the heads of the fasteners 128 may trap the respective pivot pin 108 against the respective sidewall 122 of the body 44 to thereby assist in preventing the respective pivot pin 108 from becoming inadvertently dislodged from the respective bushing 106 and/or pivot bores 98, 124.

Thus, the gripper body 44 may be rotatable about the yaw axis Z together with the yoke 90, the end effector 36, and the hub 70 relative to the forearm 20, and may also be rotatable about the roll axis Y together with the yoke 90 relative to the end effector 36, the hub 70, and the forearm 20, and may further be rotatable about the pitch axis X relative to the yoke 90, the end effector 36, the hub 70, and the forearm 20. In the embodiment shown, the yaw, roll, and pitch axes Z, Y, X intersect at a center C of the wrist joint 34 located between the end effector 36 and the gripper body 44 and, more particularly, within the square-shaped aperture 94 of the yoke 90. As shown, the pitch axis X is perpendicular to the longitudinal centerline of the gripper body 44 and the roll axis Y is parallel to or coaxial with the longitudinal centerline of the gripper body 44, such that the roll axis Y may be fixedly perpendicular to the pitch axis X irrespective of the orientation of the gripper body 44 about any of the axes Z, Y, X. The illustrated roll axis Y may also be fixedly perpendicular to the yaw axis Z irrespective of the orientation of the gripper body 44 about any of the axes Z, Y, X, while the pitch axis X may only be perpendicular to the yaw axis Z when the gripper body 44 is oriented horizontally about the roll axis Y since rotation of the gripper body 44 about the roll axis Y may change the orientation of the pitch axis X relative to the yaw axis Z.

With continuing reference to FIG. 4B, the illustrated middle support portion 114 of the gripper body 44 includes a pair of laterally-extending eyelets 130 defining respective through-bores 132 equally spaced apart from the square-shaped aperture 120 on a same side thereof, such that the through-bores 132 are equally spaced apart from the pitch axis X on a same side thereof, and further equally spaced apart from the longitudinal centerline of the gripper body 44 on opposite sides thereof, such that the through-bores 132 are equally spaced apart from the roll axis Y on opposite sides thereof, along with accompanying counterbores 134 and a pair of threaded bores 136 adjacent thereto. In the embodiment shown, the through-bores 132 are configured for axial alignment with the through-bores 60 of the prong portions 54 of the end effector 36 and for receiving at least portions of respective linear actuators 140 of the wrist assembly 30 therethrough.

In this regard, each of the illustrated linear actuators 140 of the wrist assembly 30 is electro-mechanical, and includes a sleeve 142 and a shaft 144 selectively extendable from and retractable into the sleeve 142 along a translation axis T of the actuator 140. Each shaft 144 includes a plurality of radially-extending detents 146 for mechanically engaging corresponding indents (not shown) provided in the respective sleeve 142 to inhibit rotation of the shaft 144 about the respective translation axis T relative to the respective sleeve 142. As shown, each of the linear actuators 140 further includes a motor 150 configured to effect linear movement of the shaft 144 relative to the sleeve 142 along the respective translation axis T. In one embodiment, a controller (not shown) may be in operative communication with each of the motors 150 for sending signals thereto instructing the motor 150 to activate or deactivate the respective actuator 140, such as to extend or retract the respective shaft 144 by a desired distance.

In any event, at least a portion of each illustrated sleeve 142 is received by the through-bore 132 of the respective eyelet 130 of the gripper body 44, and at least a portion of each illustrated shaft 144 is received by the through-bore 60 of the respective prong portion 54 of the end effector 36, such that the translation axes T are equally spaced apart from the pitch axis X on a same side thereof and are further equally spaced apart from the roll axis Y on opposite sides thereof. In the embodiment shown, each of the sleeves 142 is fixed against movement relative to the gripper body 44 along the respective translation axis T, and each of the shafts 144 is fixed against movement relative to the end effector 36 along the respective translation axis T. Alternatively, one or both of the actuators 140 may be inverted, with at least a portion of the sleeve 142 received by the through-bore 60 of the respective prong portion 54 of the end effector 36, and at least a portion of the shaft 144 received by the through-bore 132 of the respective eyelet 130 of the gripper body 44. In this manner, linear movement of each shaft 144 relative to the corresponding sleeve 142 along the respective translation axis T may cause movement of the respective eyelet 130 of the gripper body 44 relative to the end effector 36 along the respective translation axis T to thereby cause a corresponding rotation of the gripper body 44 about the pitch axis X and/or roll axis Y.

To that end, each of the illustrated sleeves 142 is angularly rotatably supported within the respective through-bore 132 of the gripper body 44 via respective lower spherical bearing assemblies 160, each including an inner race 162 and an outer race 164 having complementary toroidal outer and inner surfaces, respectively, configured to glide against each other. Each inner race 162 is fixedly coupled to the sleeve 142, and each outer race 164 is fixedly coupled to the gripper body 44. In this regard, each outer race 164 is received within the counterbore 134 of the respective eyelet 130 and captured thereagainst by a respective lower collar 170. As shown, each lower collar 170 includes a respective central through-bore 172 and accompanying counterbore 174 (FIG. 6B), as well as a pair of peripheral through-bores 176 adjacent the central through-bore 172. The central through-bores 172 are each configured to receive at least a portion of the respective sleeve 142, and the outer races 164 are each configured to be sandwiched between the counterbores 134, 174 of the respective eyelet 130 and collar 170. The peripheral through-bores 176 of each collar 170 are configured for axial alignment with the threaded bores 136 of the respective eyelet 130 and for receipt of respective fasteners 178 for fixedly securing the collars 170 to the gripper body 44. In this manner, each sleeve 142 may be angularly rotatable relative to the gripper body 44 and may be fixed against movement relative thereto along the respective translation axis T.

Likewise, each of the illustrated shafts 144 is angularly rotatably supported within the respective through-bore 60 of the end effector 36 via respective upper spherical bearing assemblies 180, each including an inner race 182 and an outer race 184 having complementary toroidal outer and inner surfaces, respectively, configured to glide against each other. Each inner race 182 is fixedly coupled to the shaft 144, and each outer race 184 is fixedly coupled to the end effector 36. In this regard, and with reference again to FIG. 4A, each outer race 184 is received within the counterbore 62 of the respective prong portion 54 and captured thereagainst by a respective upper collar 190. As shown, each upper collar 190 includes a respective central through-bore 192 and accompanying counterbore 194, as well as a plurality of peripheral through-bores 196 circumferentially arranged thereabout. The central through-bores 192 are each configured to receive at least a portion of the respective shaft 144, and the outer races 184 are configured to be sandwiched between the counterbores 194 of the respective prong portion 54 and collar 190. The peripheral through-bores 196 of each collar 190 are configured for axial alignment with the threaded bores 64 of the respective prong portion 54 and for receipt of respective fasteners 198 for fixedly securing the collars 190 to the end effector 36. In this manner, each shaft 144 may be angularly rotatable relative to the end effector 36 and may be fixed against movement relative thereto along the respective translation axis T.

Thus, the spherical bearing assemblies 160, 180 may cooperate with the respective actuators 140 to permit changes in angular alignment of the translation axes T of the actuators 140 (e.g., relative to the yaw axis Z), such as in response to extension or retraction of at least one of the shafts 144 relative to the respective sleeve(s) 142, in order to accommodate various corresponding movements of the gripper body 44 relative to the end effector 36.

As described above, the actuators 140 arranged within the through-bores 60, 132 are equally spaced apart from the pitch axis X on a same side thereof, and are also equally spaced apart from the roll axis Y on opposite sides thereof. As a result, various operations of one or both of the actuators 140 may be capable of adjusting the orientation(s) of the gripper body 44 (and thus the gripper 32) relative to the pitch and/or roll axes X, Y. More particularly, extension or retraction of at least one of the shafts 144 relative to the respective sleeve(s) 142 may apply a moment of force to the gripper body 44 at the eyelets 130 relative to the pitch and/or rolls axes X, Y for effecting rotation of the gripper body 44 together with the yoke 90 relative to the end effector 36, the hub 70, and the forearm 20 about the roll axis Y, and/or for effecting rotation of the gripper body 44 relative to the yoke 90, the end effector 36, the hub 70, and the forearm 20 about the pitch axis X, for example.

Figure 5A:
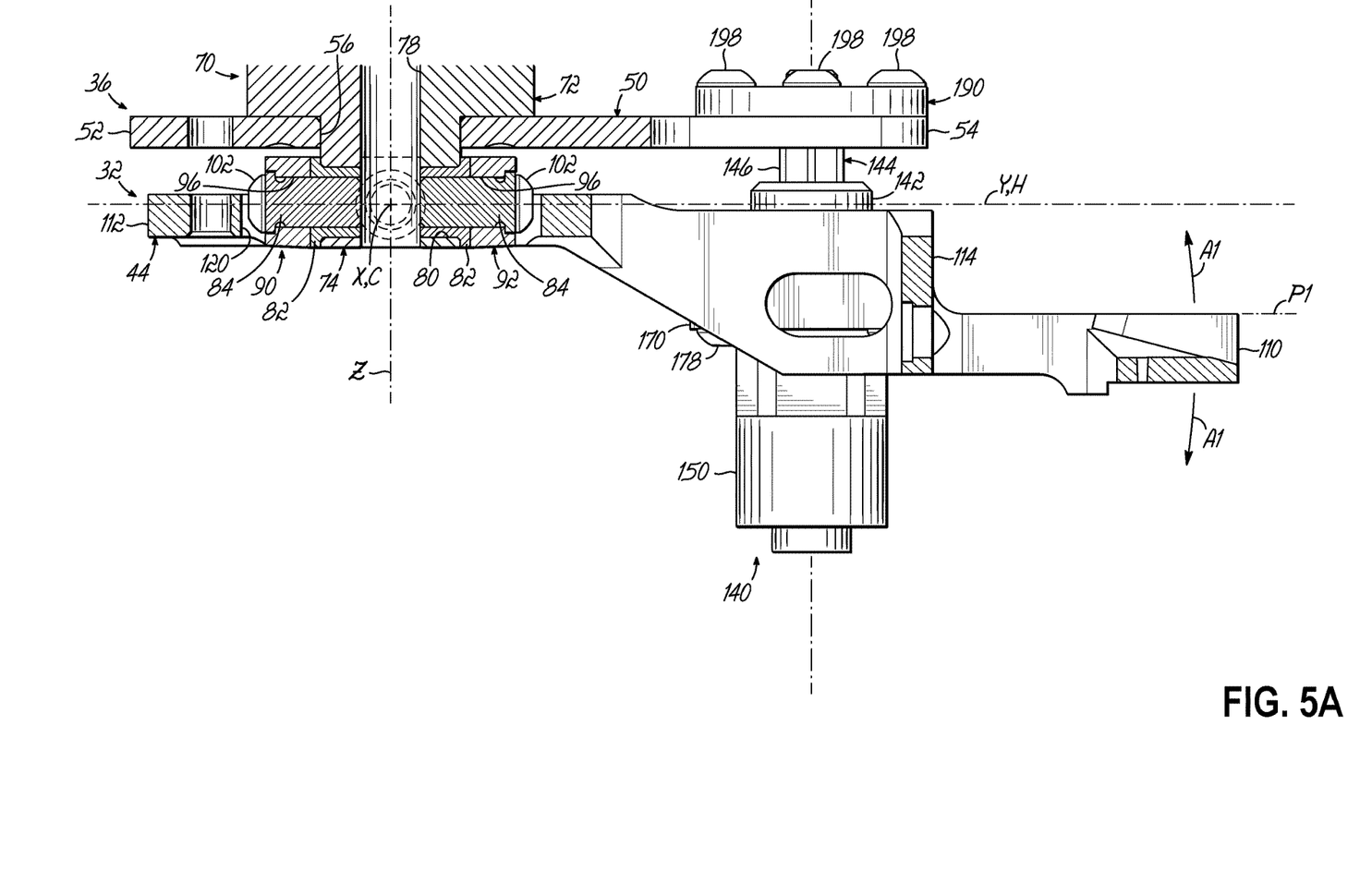
FIG. 5A is a longitudinal sectional view of the wrist assembly of FIG. 1, showing rotation of the multi-axis gripper about the pitch axis from a horizontal orientation.
Figure 5B:
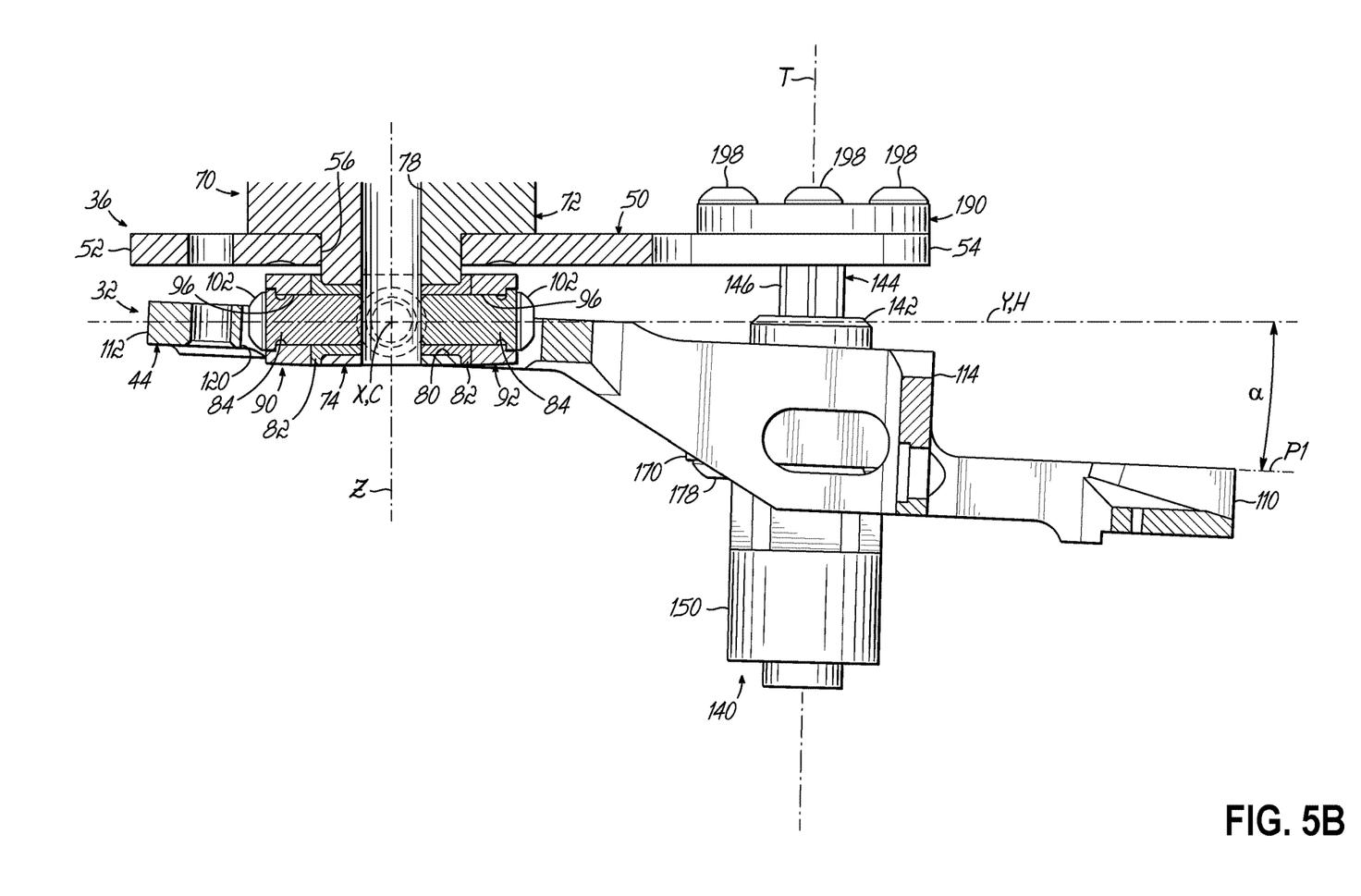
FIG. 5B is a longitudinal sectional view similar to FIG. 5A, showing the multi-axis gripper rotated about the pitch axis to a non-horizontal orientation.

In this regard, and referring now primarily to FIGS. 5A and 5B, the gripper 32 may initially be in a neutral orientation relative to the pitch and roll axes X, Y (FIG. 5A). For example, the gripper 32 may initially be horizontally level (e.g., with the support plane P1 being parallel to horizontal H), and the translation axes T of the actuators 140 may be parallel to the yaw axis Z. The actuators 140 may be subsequently activated, such as by receipt of a signal sent from the controller to the motors 150, to extend or retract the respective shafts 144 from/into the respective sleeves 142 in the same direction by the same distance to thereby rotate the gripper 32 about the pitch axis X relative to the yoke 90, the end effector 36, the hub 70, and the forearm 20, as indicated by the arrows A1. For example, the actuators 140 may be activated to extend the respective shafts 144 from the respective sleeves 142 in the same direction by the same distance to rotate the gripper 32 about the pitch axis X such that the support plane P1 of the gripper 32 is oriented relative to horizontal H (and/or relative to the roll axis Y) by an angle $\alpha$ (FIG. 5B). As shown, such rotation of the gripper 32 about the pitch axis X may cause the translation axes T of the actuators 140 to be slightly angled relative to the yaw axis Z via cooperation of the spherical bearing assemblies 160, 180. In one embodiment, rotation of the gripper 32 about the pitch axis X may be limited to a predetermined range. For example, the angle $\alpha$ may be between $-3°$ and $+3°$ relative to horizontal.

Figure 6A:
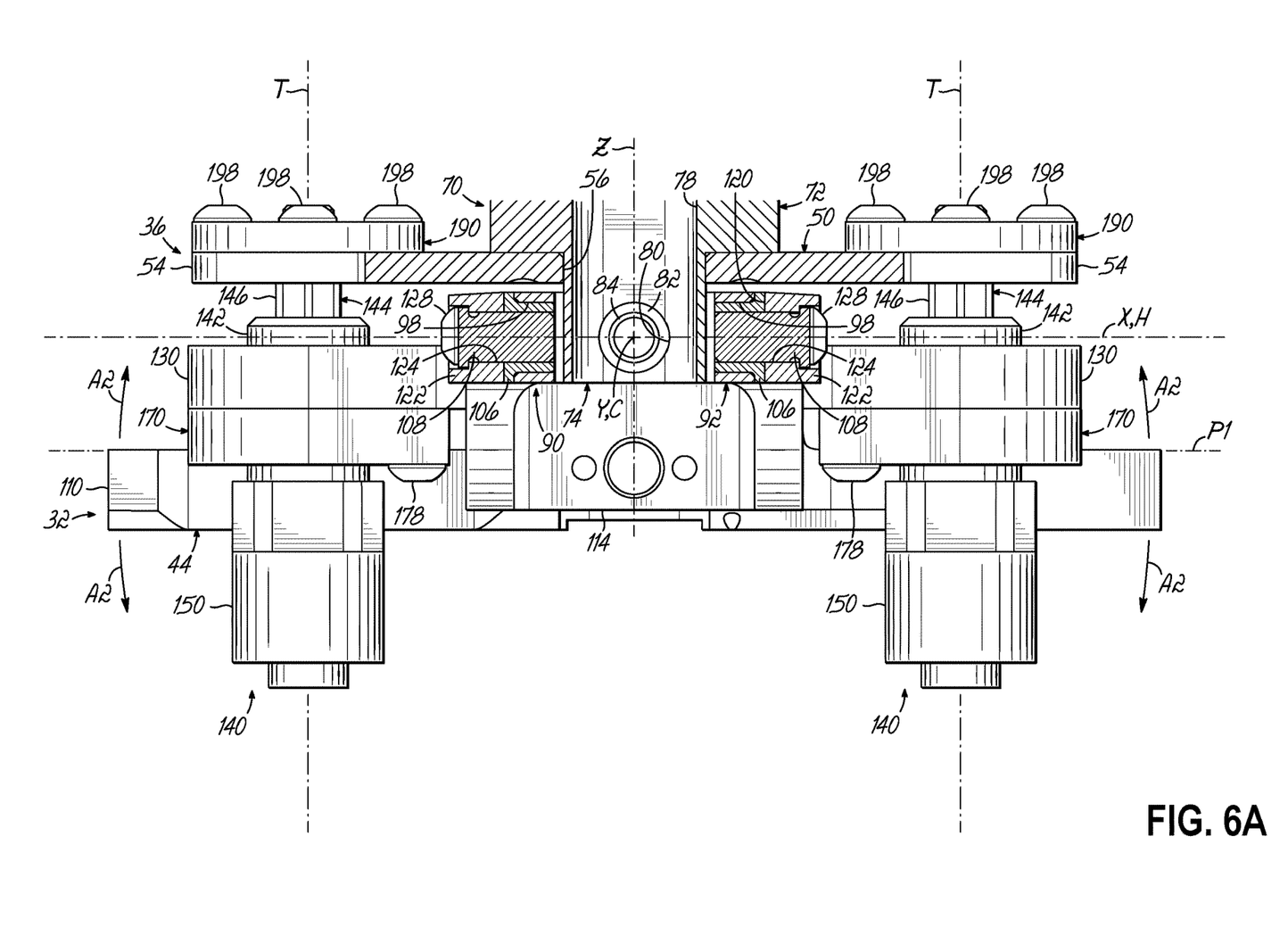
FIG. 6A is a cross sectional view of the wrist assembly of FIG. 1, showing rotation of the multi-axis gripper about the roll axis from a horizontal orientation.
Figure 6B:
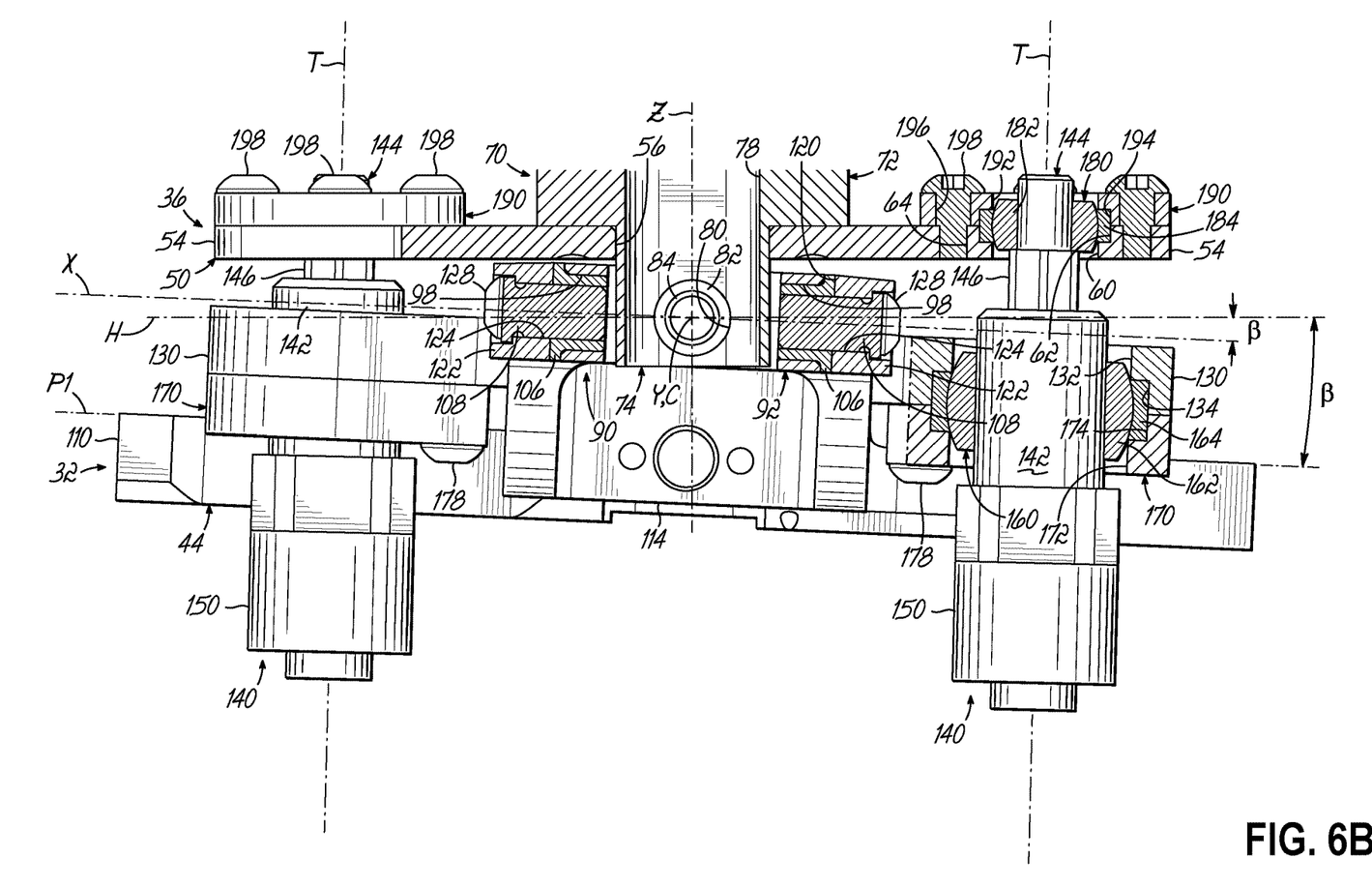
FIG. 6B is a cross sectional view similar to FIG. 6A, showing the multi-axis gripper rotated about the roll axis to a non-horizontal orientation.

Likewise, and referring now primarily to FIGS. 6A and 6B, the gripper 32 may initially be in a neutral orientation relative to the pitch and roll axes X, Y (FIG. 6A). For example, the gripper 32 may initially be horizontally level, and the translation axes T of the actuators 140 may be parallel to the yaw axis Z. The actuators 140 may be subsequently activated, such as by receipt of a signal sent from the controller to the motors 150, to extend or retract the respective shafts 144 from/into the respective sleeves 142 in opposing directions by the same distance to rotate the gripper 32 along with the yoke 90 about the roll axis Y relative to the end effector 36, the hub 70, and the forearm 20, as indicated by the arrows A2. For example, the left-hand actuator 140 may be activated to retract the respective shaft 144 into the respective sleeve 142 by a certain distance and the right-hand actuator 140 may be activated to extend the respective shaft 144 from the respective sleeve 142 by the same distance to rotate the gripper 32 about the roll axis Y such that the support plane P1 of the gripper 32 (along with the pitch axis X) is oriented relative to horizontal H by an angle $\beta$ (FIG. 6B). As shown, such rotation of the gripper 32 about the roll axis Y may cause the translation axes T of the actuators 140 to be slightly angled relative to the yaw axis Z via cooperation of the spherical bearing assemblies 160, 180, and may further cause the pitch axis X to be non-perpendicular relative to the yaw axis Z. In one embodiment, rotation of the gripper 32 about the roll axis Y may be limited to a predetermined range. For example, the angle β may be between −3° and +3° relative to horizontal.

Figure 7:
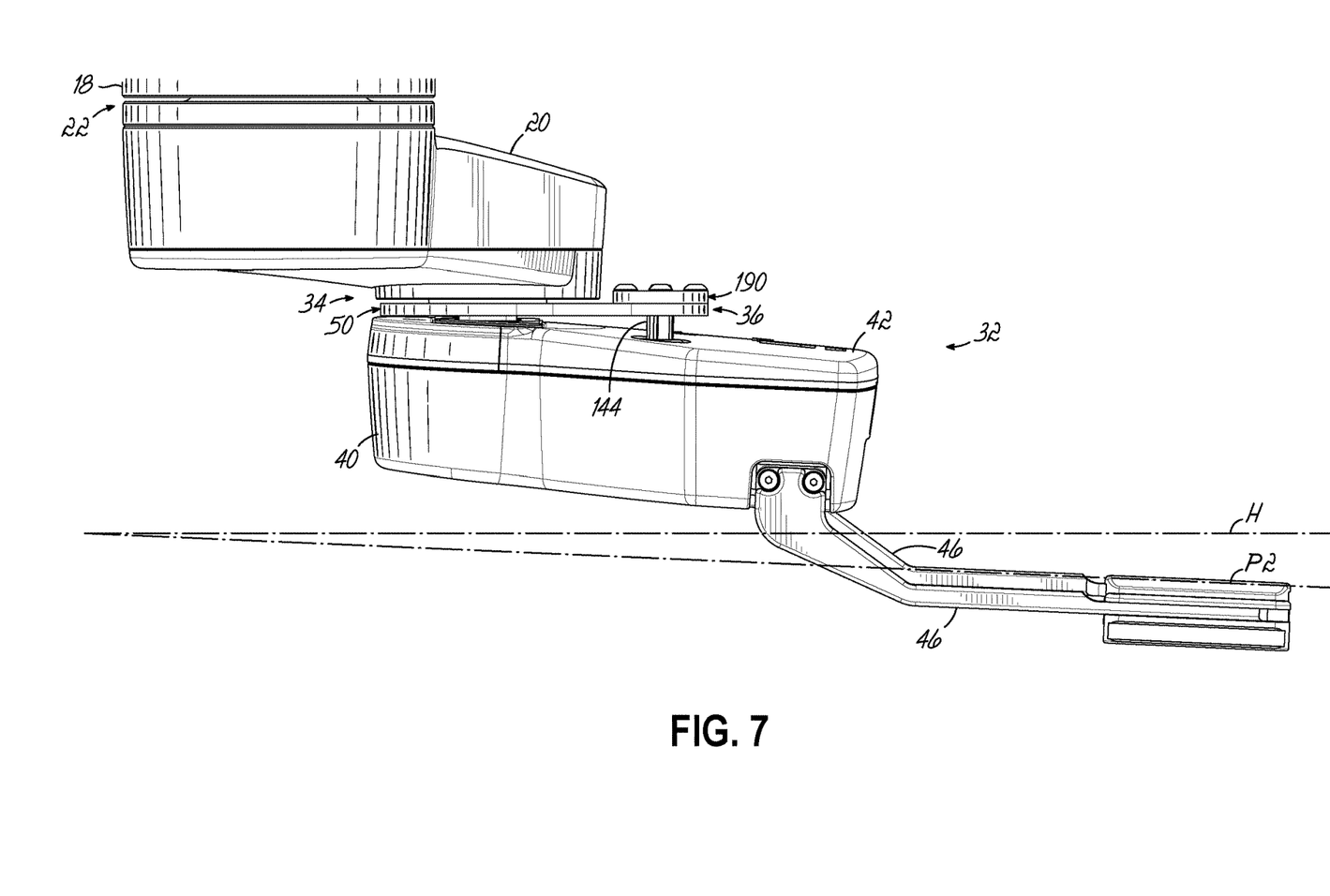
FIG. 7 is a side elevation view of the wrist assembly of FIG. 1 showing the multi-axis gripper rotated about both the pitch and the roll axes.
Figure 8:
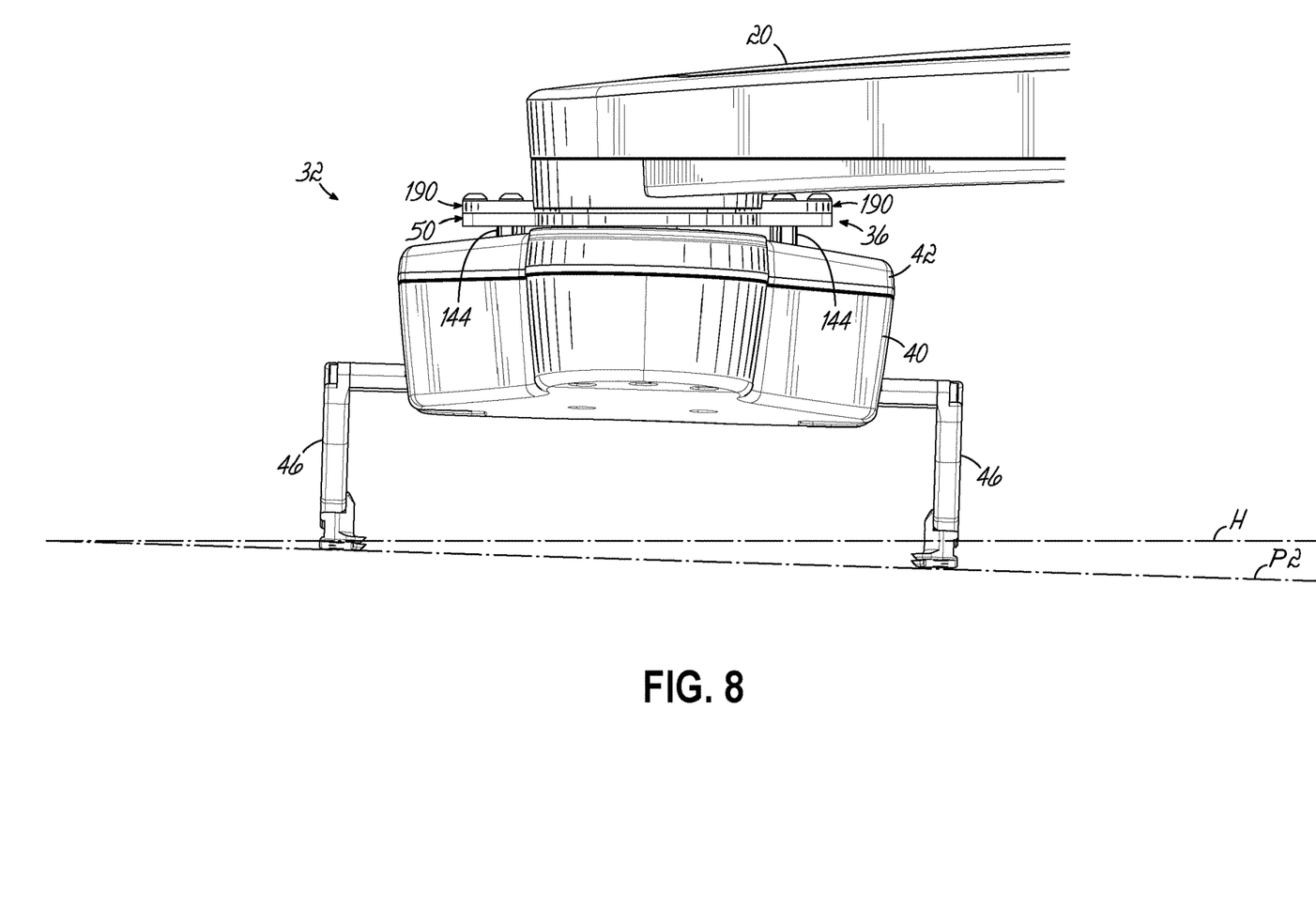
FIG. 8 is a rear elevation view of the wrist assembly of FIG. 1 showing the multi-axis gripper rotated about both the pitch and the roll axes.

Thus, the actuators 140 may provide automated adjustment of the gripper 32 about the pitch and roll axes X, Y. As shown in FIGS. 7 and 8, synchronized or other coordinated extension and/or retraction of the shafts 144 of the actuators 140 by varying distances may provide controlled adjustment of the gripper 32 about both the pitch and roll axes X, Y. In this regard, the gripper 32 is shown rotated about the pitch axis X such that the gripping plane P2 of the gripper 32 is oriented relative to horizontal H by an angle α so as to orient the fingers 46 slightly downwardly from the pitch axis X (FIG. 7), and is further rotated about the roll axis Y such that the gripping plane P2 of the gripper 32 is oriented relative to horizontal H by an angle β so as to orient the left-hand finger 46 slightly upwardly relative to the right-hand finger 46 (FIG. 8). In this manner, the gripper 32 may be rotated about the pitch and/or roll axes X, Y to compensate for nests that are not level relative to the gripper 32 so that the gripper 32 may reliably retrieve/deposit a microtiter plate from/on such nests via the fingers 46 of the gripper 32.

While not shown, the gripper 32 may include one or more sensors configured to detect a horizontal orientation of a nest and/or of a microtiter plate held thereby relative to the gripper 32, and may be in operative communication with the controller of the actuators 140 for sending signals thereto indicative of the detected relative horizontal orientation. The controller may be configured to determine a desired orientation of the gripper 32 about the pitch and/or roll axes X, Y based on the detected relative horizontal orientation and instruct the motors 150 accordingly so that the gripper 32 and, more particularly, the fingers 46 may be oriented to be horizontally level relative to the nest and/or microtiter plate.

Thus, the robotic device 10 may have an aggregate positioning capability of six degrees of freedom, with the position and orientation of the gripper 32 in three-dimensional space being adjustable in all three components of translation and in all three components of rotation. In one embodiment, the robotic device 10 may initially be equipped with a default "fixed" gripper, such that the robotic device 10 may initially have an aggregate positioning capability of only four degrees of freedom, and may subsequently be readily and easily retrofitted with the wrist assembly 30 including at least the multi-axis gripper 32 to provide the robotic device 10 with the additional two degrees of freedom, without requiring a complete overhaul or replacement of the robotic device 10.

While not shown, the gripper 32 may further include various other components for effecting lateral movement of the fingers 46 toward and away from each other for selectively gripping and releasing a microtiter plate positioned therebetween, such as one or more racks, pinions, and associated actuators, as is known.

While the present invention has been illustrated by the description of various embodiments thereof, and while the embodiments have been described in considerable detail, it is not intended to restrict or in any way limit the scope of the appended claims to such detail. Thus, the various features discussed herein may be used alone or in any combination. Additional advantages and modifications will readily appear to those skilled in the art. The present invention in its broader aspects is therefore not limited to the specific details and illustrative examples shown and described. Accordingly, departures may be made from such details without departing from the scope of the general inventive concept.

What is claimed is:

1. A wrist assembly for a lab automation robot, comprising:
    a gripper including a gripper body having a rear mounting portion and a gripper aperture extending through the rear mounting portion, wherein the rear mounting portion includes a first pair of axially-aligned pivot bores arranged on opposing sides of the gripper aperture;
    a yoke including a wall and a second pair of axially-aligned pivot bores extending through a first pair of opposing sides of the wall, wherein the yoke is at least partially received by the gripper aperture such that the first pair of pivot bores are axially aligned with the second pair of pivot bores and receive respective pivot pins therethrough,
    wherein the first and second pairs of pivot bores and respective pivot pins at least partially define a first axis of rotation of the gripper.

2. The wrist assembly of claim 1, wherein the yoke includes a third pair of axially-aligned pivot bores extending through a second pair of opposing sides of the wall such that the first and second pairs of pivot bores are axially perpendicular to the third pair of pivot bores, and wherein the third pair of pivot bores at least partially define a second axis of rotation of the gripper.

3. The wrist assembly of claim 2, further comprising:
    a hub including an upper cylindrical portion configured to be rotatably received by a bore of the lab automation robot, a lower stem portion, and a fourth pair of axially-aligned pivot bores extending through a pair of opposing sides of the lower stem portion, the fourth pair of pivot bores being axially aligned with the third pair of pivot bores and receiving respective pivot pins therethrough,
    wherein the third pair of pivot bores, the fourth pair of pivot bores, and the respective pivot pins collectively define the second axis of rotation of the gripper, and wherein the upper cylindrical portion at least partially defines a third axis of rotation of the gripper.

4. The wrist assembly of claim 3, wherein the wall of the yoke defines a yoke aperture, and wherein the yoke aperture receives the lower stem portion of the hub.

5. The wrist assembly of claim 4, wherein the first, second, and third axes of rotation of the gripper intersect each other at a wrist joint center positioned within the yoke aperture.

6. The wrist assembly of claim 3, further comprising:
    an end effector including a plate fixedly coupled to the hub, and a pair of upper through-bores extending through the plate and equally spaced apart from the first axis of rotation on a same side thereof and further equally spaced apart from the second axis of rotation on opposite sides thereof.

7. The wrist assembly of claim 6, wherein the end effector includes an end effector aperture extending through the plate, and wherein the end effector aperture receives the lower stem portion of the hub above the yoke.

8. The wrist assembly of claim 6, wherein the gripper body has a front platform portion for movably supporting a pair of fingers, and a middle support portion extending between the front platform portion and the rear mounting portion, wherein the middle support portion includes a pair of laterally-extending eyelets defining respective lower through-bores equally spaced apart from the first axis of rotation on a same side thereof, and further equally spaced apart from the second axis of rotation on opposite sides thereof, and wherein each of the lower through-bores is configured for axial alignment with a respective one of the upper through-bores of the end effector.

9. The wrist assembly of claim 8, further comprising:

a pair of linear actuators, each including first and second portions configured to be selectively translatable relative to each other along a respective translation axis, wherein the first portions are received by the respective upper through-bores of the end effector and the second portions are received by the respective lower through-bores of the gripper body, such that translation of the first and second portions of each linear actuator relative to each other along the respective translation causes rotation of the gripper about at least one of the first and second axes of rotation.

10. The wrist assembly of claim 9, wherein each of the first and second portions is angularly rotatably supported within the respective one of the upper and lower through-bores by a spherical bearing assembly.

11. A multi-axis gripper for a lab automation robot, comprising:

a gripper body having a front platform portion and a rear mounting portion for facilitating movable coupling of the gripper to an end effector of the lab automation robot;

a pair of fingers extending longitudinally from the front platform portion of the body and configured to be laterally movable toward and away from each other for selectively gripping and releasing an object positioned therebetween; and an aperture extending through the rear mounting portion, wherein the rear mounting portion includes a pair of sidewalls arranged on opposing sides of the aperture and a pair of axially-aligned pivot bores extending through the sidewalls and configured to at least partially define an axis of rotation of the gripper.

12. The multi-axis gripper of claim 11, wherein the pair of axially-aligned pivot bores are configured to at least partially define a pitch axis of the gripper relative to the end effector.

13. The multi-axis gripper of claim 11, wherein the pair of axially-aligned pivot bores are configured to receive torque directed about a yaw axis from a hub of the lab automation robot such that the torque may be transferred to the gripper body.

14. The multi-axis gripper of claim 11, wherein the rear mounting portion includes a pair of threaded bores adjacent each of the pivot bores for threadably receiving respective fasteners configured to trap respective pivot pins received within the corresponding pivot bores against the gripper body.

15. The multi-axis gripper of claim 11, wherein the gripper body has a middle support portion extending between the front platform portion and the rear mounting portion, and wherein the middle support portion includes a pair of laterally-extending eyelets defining respective through-bores equally spaced apart from the aperture on a same side thereof, and further equally spaced apart from a longitudinal centerline of the gripper body on opposite sides thereof, wherein the through-bores are configured to receive at least portions of respective linear actuators therethrough.

16. A lab automation robot comprising:

a stationary base;

a swiveling tower rotatably mounted to the stationary base about a first vertical axis;

an arm vertically translatably mounted to the tower;

an articulating forearm coupled to the arm at an elbow joint and pivotable relative thereto about a second vertical axis; and a wrist assembly including a multi-axis gripper operatively coupled to the forearm at a wrist joint and rotatable relative thereto about a third vertical axis, wherein the gripper is further rotatable relative to at least the forearm about a first horizontal axis and about a second horizontal axis, the multi-axis gripper comprising:

a gripper body having a front platform portion and a rear mounting portion for facilitating movable coupling of the gripper to an end effector of the lab automation robot;

a pair of fingers extending longitudinally from the front platform portion of the body and configured to be laterally movable toward and away from each other for selectively gripping and releasing an object positioned therebetween; and an aperture extending through the rear mounting portion, wherein the rear mounting portion includes a pair of sidewalls arranged on opposing sides of the aperture and a pair of axially-aligned pivot bores extending through the sidewalls and configured to at least partially define the second horizontal axis of rotation of the gripper.

* * * * *